Dec. 14, 1965   H. STEUER ETAL   3,222,946
LINK CHAIN WITH TRANSVERSELY SLIDABLE
SETS OF SEGMENTS MOUNTED IN CAGES
Filed April 29, 1964   2 Sheets-Sheet 1

INVENTOR.
HERBERT STEUER
GEORG OTT
GEORG RACK
RUDOLF Schrodt
BY

United States Patent Office 3,222,946
Patented Dec. 14, 1965

3,222,946
LINK CHAIN WITH TRANSVERSELY SLIDABLE SETS OF SEGMENTS MOUNTED IN CAGES
Herbert Steuer, Bad Homburg vor der Höhe, Georg Ott, Bergen-Enkheim, Georg Rack, Kalbach, and Rudolf Schrodt, Kronberg, Taunus, Germany, assignors to Reimers Getriebe K.G., Ascona, Switzerland, a firm of Switzerland
Filed Apr. 29, 1964, Ser. No. 363,544
Claims priority, application Germany, May 2, 1963, R 35,074
14 Claims. (Cl. 74—236)

The present invention relates to a link chain for an infinitely variable cone pulley transmission which is provided with two pairs of conical pulley disks with radially extending teeth thereon, wherein for the purpose of changing the speed ratio of the transmission the disks of each pair are movable relative to each other in the axial direction inversely to the movement of the disks of the other pair, and wherein each link of the link chain is provided with a cage containing a set of segments which, when entering between the conical disks of one pair and the teeth thereon, are shifted transversely within their cage so as to form teeth which positively engage with those on the conical disks to transmit the driving forces from one pair of disks to the other.

There are link chains of this type already known in which the segments within each cage are braced at the outer ends of the cage by end segments which are considerably thicker than the transversely movable tooth-forming segments and transmit the forces from these segments to the cage and thereby to the individual link straps of the link chain. Since for the purpose of varying the speed ratio of the transmission the diameter of the loop (hereafter called the "loop diameter") at which the link chain engages with the toothed conical disks of each pair is changeable inversely to the loop diameter of the disks of the other pair, it is not possible to maintain the segments of each set in a certain fixed position, but they must be capable to carry out a tilting movement about an axis extending transversely to the direction of travel of the chain so as to adapt themselves to the changing loop diameter. In order to make this possible, it has previously been necessary to mount the thick end segments within the round ends of the sleevelike cage so as to be movable about an axis extending transversely to the direction of travel of the chain.

In order to take up and support the tilting movement of the tooth-forming or operating segments, the end segments must be made of a considerable thickness. However, such a thickness of the two end segments of each chain link reduces the number of operating segments of the link or requires each link to be made of a greater length. The reduction of the number of operating segments of each link, in turn, means that less power may be transmitted by the chain whereas an increase of the length of each chain link means that the chain cannot run with a very small loop diameter between the toothed conical disks and that in addition the weight of the individual links and thus also the centrifugal force produced by them is increased so that the wear upon the link pins of the chain is also increased. For technical as well as economic reasons, it is, however, often required to build such a transmission of the smallest possible dimensions. Consequently, the link chain of such a transmission must be capable of transmitting the greatest possible force and it must also be able to run at a very small loop diameter. The first requirement may be fulfilled by providing each chain link with the largest possible number of segments for participating in the formation of teeth and in the transmission of forces, whereas the second requirement, i.e. that of permitting a very small loop diameter, may be fulfilled by providing a small chain pitch so that the chain can properly engage with the toothed conical disks at the smallest loop diameter which may be desired. According to the invention it has now been found that it is a prerequisite for fulfilling both of these requirements to make those parts of the chain which do not or might not participate in the formation of teeth, i.e. the outermost segments and the link straps of the chain, of the smallest possible dimensions.

There is another type of link chain known in which the transversely slidable sets of segments are mounted directly in the link straps, that is, without being enclosed by cages. In these chains, the segments are merely braced on the the side of the back of the chain by a cover plate. The sets of segments are also in this case supported at their outer ends by thick end segments which do not participate in the transverse shifting movement of the other segments and thus also not in the formation of teeth. Although by the omission of the cage for each set of segments it is possible to provide a slightly larger number of segments in each link or to reduce the chain pitch by twice the wall thickness of a cage, this chain construction also does not permit any omission of the thick end segments which must be inserted into each link for transmitting the forces from the tooth-forming segments to the chain link or vice versa.

The present invention relates to improvements in a link chain of the type in which each individual link of the chain is provided with a cage for guiding a set of transversely slidable segments for a positive transmission of forces between two pairs of conical disks with radially extending teeth of a infinitely variable cone pulley transmission in which for the purpose of varying the speed ratio of the transmission the toothed conical disks of each pair are movable in the axial direction relative to each other inversely to the movement of the disk of the other pair.

It is the principal object of the present invention to increase the number of tooth-forming segments of each chain link and to reduce the size of the chain pitch of a link chain of the type and made for the purpose as last described. According to the invention, this object is attained by providing each of the opposite end walls of the tubular sheet-metal cage, which conventionally surrounds each set of segments and is mounted in apertures in the link straps, with an inwardly curved bulge or recess, the wall of which directly engages with an supports the adjacent outermost segments of the set, and by making the outer end walls of the apertures in the link straps of each link of a shape corresponding to these bulges so as to engage tightly with the end walls of the cage.

A segment cage of this inventive design has the advantage that it is no longer necessary to employ the thick end segments as were previously required for supporting the set of segments since due to its particular construction and the resulting greater rigidity and greater resistance to torsional forces than those of the conventional sleevelike cages the inwardly curving sheet-metal cage according to the invention is capable of accomplishing the purposes for which these thick end segments had to be previously provided. If the length of each chain link remains unchanged as compared with one containing the thick end segments, the number of operating segments in each link may therefore now be increased by an amount which is substantially in accordance with the thickness of the two thick end segments or if the number of segments in each set remains unchanged the length of each chain link may be reduced accordingly. If both possibilities are partly applied, the power which may be transmitted by the chain will be increased and the chain pitch will also be reduced so that the chain may run at a smaller loop diameter. Furthermore, since the ends of the cage are curved inwardly and away from the link pins which connect the link straps of each link to those of the adjacent links, the distance between each link pin and the adjacent end of the cage is increased as compared with the conventional link structure and the two link pins on each link may therefore now be positioned at a smaller distance from the center of the cage and thus at a smaller distance from each other. This constitutes a further possibility of reducing the size of the chain pitch.

The object of the invention is therefore attained by avoiding the use of the thick end segments and the disadvantages thereof and by substituting for them a sheet-metal cage which is designed according to the invention and is adapted to take over the functions of a conventional sleevelike cage plus those of the thick end segments. Aside from the numerous other advantages as heretofore mentioned, there is now the further advantage attained that due to the omission of the thick and heavy end segments, the chain according to the invention has a considerably lower weight than a conventional link chain of the type as described which has the same length and is capable of transmitting the same power. This permits the new chain to be run at a higher speed. A transmission of the type as described above in which a link chain according to the invention is employed may therefore also be built of considerably smaller dimensions, although it may transmit the same or even a higher power than a similar transmission with a conventional link chain.

Since for adjusting the chain to different loop diameters the outer segments must be capable of rolling or pivoting on the inwardly curved end walls of the sheet-metal cage, it is advisable also to make at least those parts of the outer segments of a curved shape which are in engagement with the curved end walls and to curve them in the same direction as these end walls. It is further advisable to make the radius of curvature of the outer segments greater than that of the end walls of the cage and also to curve some of the following segments in the same direction but in a manner so that the curvature of each subsequent segment has a larger radius than the preceding segment until the following segments are straight. Due to such a curvature, the outer segments have a greater rigidity than the inner ones and they also have a larger surface contact with each other and, through the outermost segments, with the curved end walls of the cage, so that the specific pressure is more evenly distributed.

In order to attain a higher bending resistance of the outer segments, it may also be advisable to make them of a greater thickness than the other segments. Preferably a few of the segments adjacent to the outer segments are also made of a greater thickness but so as gradually to decrease from that of the outer segments to that of the segments of the normal thickness.

In view of the extremely small chain pitch which may be attained by the inventive construction of the chain links there is a possibility that, when the chain enters between a pair of toothed conical disks, difficulties may arise due to the fact that the outer segments have to carry out a considerable pivoting movement about an axis transverse to the direction of travel of the chain and must also carry out a lateral sliding movement. In order to facilitate this movement and also to prevent the outer segments from being squeezed or jammed into the rounded upper and lower outer corners of the cage, it has been found advisable to make the outer segments of a lower height in the radial direction than the other segments of each set and also to reduce the height of some of the segments adjacent to the outer segments gradually from the full height of the segments in the central part of the set toward the outer segments and the height thereof.

Although the reduction of the surface area of the outer segments which is adapted to engage with the tooth flanks of the teeth of the conical disks results in an increase of the specific surface pressure of these segments, the result is thereby attained, which is absolutely necessary if the chain should be adjustable to a small loop diameter, that because of their small radial height the outer segments, that is, those segments which are pivoted more than the others in a direction transverse to the direction of travel of the chain, will enter without jamming between the teeth of the conical disks. This also increases the efficiency of the link chain according to the invention since the interior losses which are caused by friction are reduced.

It has further been found to be advisable to design the cage of such a shape that its inner width as seen in the longitudinal direction of the chain gradually increases from its center toward its two open ends. A cage of such a design has the advantage that especially when the maximum power is being transmitted, the segments which are being bent will have a large surface contact with the cage, whereby the specific surface pressure will be reduced and the outer segments will be prevented from breaking.

The same effect may be attained by making the cage of a greater length so that its ends project beyond the normal width of the chain as determined by the outer link straps so that resilient supporting surfaces are produced which can yield under the contact pressure of the outer segments and will thus permit a full yielding engagement of the outer segments with the cage whereby the specific surface pressure will be reduced.

The construction of the cage may be carried out, for example, by bending it of a strip of sheet metal so that the abutting ends of the strip are located on the lower side of the cage. It may, however, also be made of a tubular material, of a thin wall thickness which is then pressed into the desired shape of the cage.

If the cage is made of a strip of sheet metal, this strip may have two parts of a greater thickness which are spaced at a certain distance from each other so that, when the strip is bent to form the cage, these parts form the curved end walls which will then have a greater thickness than the longitudinal walls.

The various features of the link chain according to the invention as heretofore described may be combined with each other in any suitable manner to arrive at the most suitable chain construction which will comply with all of the requirements of any particular transmission.

The various features and advantages of the present invention will become more clearly apparent from the following detailed description of several preferred embodiments thereof which is to be read with reference to the accompanying drawings, in which—

FIGURE 7 shows a horizontal section of a sheet-metal cage which is shaped in accordance with the curvature to which the outer segments may be bent, one of which is shown as engaging with this cage; while

Figure 1:
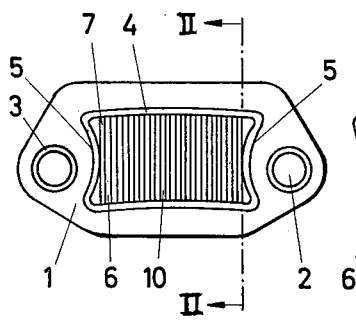
FIGURE 1 shows a side view of a chain link.
Figure 2:
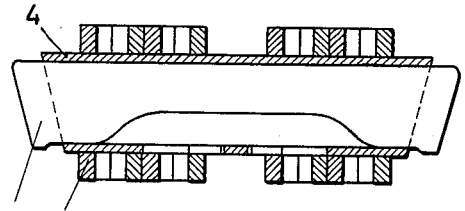
FIGURE 2 shows a cross section which is taken along the line II—II of FIGURE 1.
Figure 8:
FIGURE 8 shows a side view of a cage which is made by being bent of a sheet-metal strip which has parts of an increased thickness which form the opposite outer walls of the cage.
Figure 9:
FIGURE 9 shows the strip from which the cage of FIGURE 8 is formed.
Figure 3:
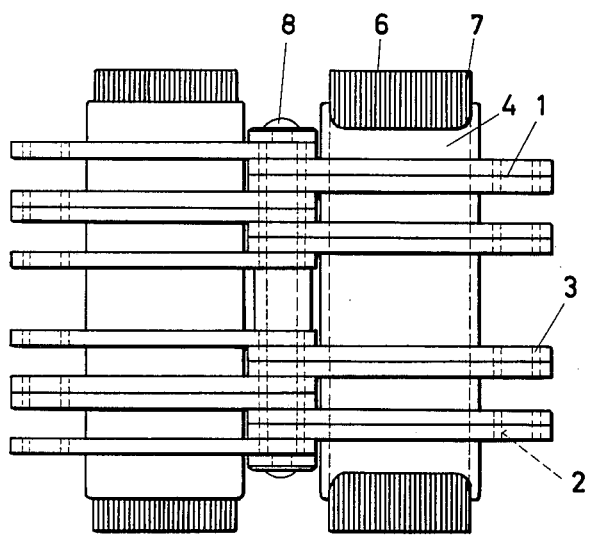
FIGURE 3 shows a top view of two interconnected chain links.

FIGURE 1 illustrates one of the link straps 1 of a link of a chain according to the invention. Each of these link straps 1 is provided with two bores 2 with the bushings 3 therein for receiving the link pins. Each link strap 1 is further provided with an aperture in which a sheet-metal cage 4 is mounted, the opposite end walls 5 of which are inwardly curved. The cage is shown in FIGURE 8 and is formed by bending the strip shown in FIGURE 9 upon itself, with the projections 4' facing inwardly and constituting the end walls 5 of the cage. This cage 4 surrounds a set of transversely slidable segments, all of which are adapted to form teeth and which consist of inner segments 6 and 10 and outer segments 7 at the opposite ends of the set. FIGURE 2 shows such a chain link in cross section and illustrates particularly the shape of the inner segments 6 and 10. FIGURE 3 shows a top view of two chain links which are interconnected by a link pin 8.

When the link chain according to the invention enters between a pair of conical pulley disks of the transmission, each of which is provided with radially extending teeth which are offset relative to the teeth of the other disk so that the teeth of one disk are opposite to the tooth spaces of the other disk, the segments 6, 7, and 10 engaging at one end with the teeth of one disk and entering at the other end into the tooth spaces of the other disk are thereby shifted longitudinally and thereby also form teeth and tooth spaces. The number of segments which are required to form one tooth varies in accordance with the particular loop diameter of the chain.

The segments 6 and 10 then engage upon the tooth flanks of the conical disks and transmit the forces to the outer segments 7 which in turn transmit the forces to the inner side of cage 4 which then transmits them further at its outer side to the link straps 1. Due to the curvature of the end walls 5 and of cage 4 the outer segments 7 are able to roll or pivot freely about an axis which extends transversely to the direction of travel of the chain and also to slide parallel to this axis.

Figure 4:
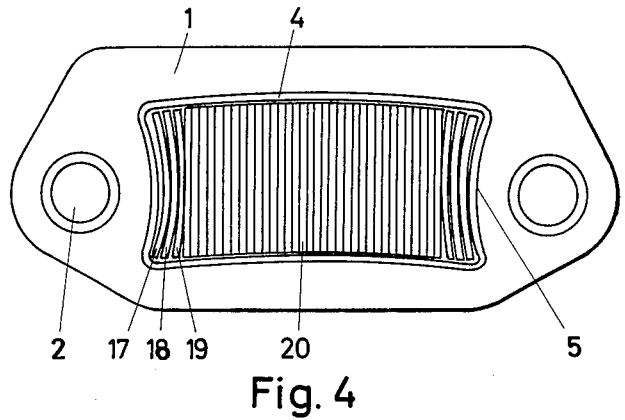
FIGURE 4 shows a side view of a modification of a chain link with curved end segments.

The outer segments adjust themselves still more easily by being curved in the same direction as the end walls 5. This is illustrated in FIGURE 4, in which the outermost segments 17 and the adjacent segments 18 and 19 have a curvature which decreases toward the center of the set from one segment to the outer until the segments are straight.

Figure 6:
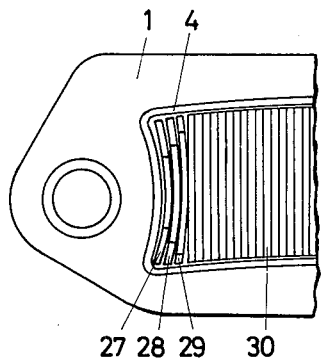
FIGURE 6 shows a partial side view of a chain link according to FIGURE 5.
Figure 5:
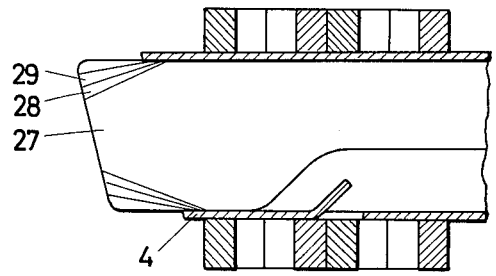
FIGURE 5 shows a cross section similar to that according to FIGURE 2, but of a chain link in which the outer segments have a smaller radial height.

It is also possible to improve and facilitate the adjustment of the outer segments by reducing the size of the contact surfaces of the outer segments. As illustrated in FIGURES 5 and 6, the outermost segments 27 and the adjacent segments 28 and 29 have a progressively smaller radial height than the segments 30 within the central part of the set. As shown particularly in FIGURE 6, the outer segments 27, 28, and 29 may in addition be curved in the same manner as shown in FIGURE 4, that is, in the same direction as the end walls 5 of cage 4. Such a reduction of the radial height of the segments 27, 28, 29 is especially of importance in order to effect an easy engagement of the chain with the radial teeth of each pair of conical disks when entering between them.

Of course, such outwardly tapering segments as shown in FIGURES 5 and 6 no longer permit their traverse movement to be limited by the provision of outwardly extending projections as commonly used today and as shown in FIGURE 2, which will abut against the end surface of the cage in order to prevent the segments from being shifted too far. The stop means for preventing an excessive transverse movement of the segments are then preferably provided on the lower sides thereof, as illustrated in FIGURE 5. In order to reduce the weight of the chain, the central part of the segments may be made of a smaller width than the outer parts so that a recess is formed in each segment of the set. Tabs are then cut into the lower side of the cage and are bent upwardly into these recesses and are adapted to abut against the end walls thereof so as to limit the transverse movements of the segments. In place of such tabs, it is also possible to dent the wall of the cage inwardly or to make it inwardly of a greater thickness so as to form stops at the required points. Such central recesses in the segments as well as such stop projections in the cages in cooperation with these recesses may also be employed for the same purposes in link chains of other constructions.

Figure 7:
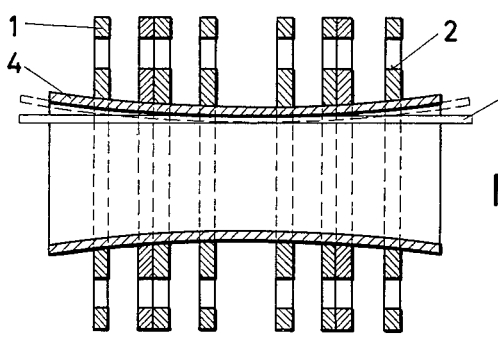

In order to attain the greatest possible surface engagement of the outer segments 7, 17, or 27 with the sheet-metal cage 4, the inner width of the cage may be gradually increased from the center toward both open ends in a manner as shown in FIGURE 7. Such a design of the cage 4 has the advantage that it greatly reduces the danger of breakage of the outer segments 7, 17, or 27 and also of the adjacent segments 6, 18, 19, 28, and 29.

Figure 11:
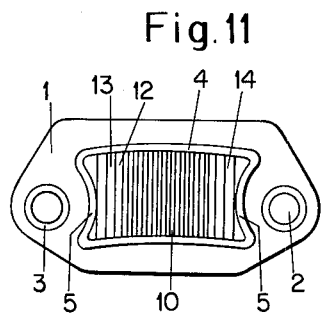
FIGURES 10 and 11 are end views showing modified constructions according to the invention.
Figure 10:
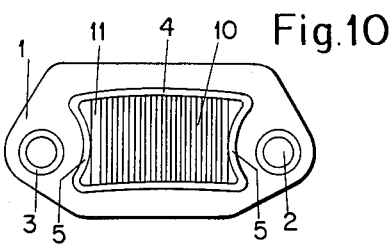

In FIGURE 10, the outermost segments 11 are made thicker than the inner segments 10, while in the form of FIGURE 11 the segments 12, 13, 14 at the ends are of progressively increasing thickness.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A link chain for an infinitely variable cone pulley transmission having at least two pairs of conical pulley disks with radially extending teeth thereon and the disks of each pair being movable relative to each other in the axial direction inversely to the movement of the disks of the other pair for the purpose of varying the speed ratio of the transmission, said chain comprising a plurality of links and each of said links comprising a plurality of link straps having apertures, and a tubular cage mounted in said apertures and a set of segments enclosed within and slidably guided by said cage and adapted when entering between said toothed conical disks of one pair to be shifted within said cage transversely to the direction of travel of said chain so as to form teeth adapted to engage positively with the teeth of said disks, said cage having opposite end walls facing in the direction of travel of said chain and each having a part curved inwardly toward the other end wall, the outermost segments of said set directly engaging upon and being supported by and tiltable on said curved parts of said end walls, the end walls of said apertures in said link straps of each link fully engaging with the outer sides of said end walls of said cage, the total thickness of all of said segments substantially equalling said space between the curved parts of the end walls, and the surfaces of the outermost segments facing the end walls of the cage deviating from the inner surfaces of such end walls.

2. A link chain as defined in claim 1, in which at least the parts of said outermost segments of each set engaging with the inwardly curved parts of said end walls of said cage are curved substantially in the same direction as said parts of said end walls.

3. A link chain as defined in claim 2, in which said curved parts of said outermost segments of each set have a radius of curvature greater than that of the curved parts of the end walls of said cage.

4. A link chain as defined in claim 2, in which said curved parts of said outermost segments of each set have a radius of curvature greater than that of the curved parts of the end walls of said cage, at least one of the segments adjacent to each of said outermost segments also having a part curved in substantially the same direction as and engaging with said first curved part and having a radius of curvature greater than that of said curved part of said outermost segments.

5. A link chain as defined in claim 2, in which each of several of the segments adjacent to each of said outermost segments also has a part curved substantially in the same direction as said curved part of said end walls of said cage and engaging with the curved part of the preceding segment, said curved parts of said outermost segments and of said adjacent segments, each having a radius of curvature greater than that of the curver parts of said end walls of said cage, the radius of curvature of said curved parts of each of said segments being greater than that of the curved part of the preceding segment until the following segments toward the center of said set are straight.

6. A link chain as defined in claim 1, in which said outermost segments have a greater thickness than the other segments of each set.

7. A link chain as defined in claim 1, in which several of the outer segments adjacent to each inwardly curved end wall of said cage have a greater thickness than the more central normal segments of each set, each of said outer segments having a thickness smaller than the preceding outer segment until it has the same thickness as said normal segments.

8. A link chain as defined in claim 1, in which said outermost segments have a smaller height in the radial direction than the internal radial height of the cage.

9. A link chain as defined in claim 1, in which several of the outer segments adjacent to each end wall of said cage have a smaller height in the radial direction than the internal radial height of the cage, the height of each of said outer segments being greater than that of the preceding outer segment until it has the height of said normal segments.

10. A link chain as defined in claim 1, in which said cage has an inner width gradually increasing from its center toward both open ends thereof.

11. A link chain as defined in claim 1, in which said cage projects at both ends beyond the normal width of said chain as seen transversely to its direction of travel and as determined by the distance between the outer link straps of each link.

12. A link chain as defined in claim 1, in which said cage comprises a closed tubular member of sheet metal having a thin wall.

13. A link chain as defined in claim 1, in which said cage comprises a strip of sheet metal, the ends of said strip substantially abutting each other at the inner side of said chain.

14. A link chain as defined in claim 1, in which said cage comprises a strip of sheet metal having parts of greater wall thickness spaced from each other, said parts forming the inwardly curved parts of said end walls of said cage.

References Cited by the Examiner
UNITED STATES PATENTS

| | | | |
|---|---|---|---|
| 1,966,831 | 7/1934 | Oakes et al. | 74—230.17 |
| 2,266,688 | 12/1941 | Keller | 74—245 |

DON A. WAITE, *Primary Examiner.*